United States Patent [19]

Ainslie et al.

[11] Patent Number: 5,412,672
[45] Date of Patent: May 2, 1995

[54] WAVE-GUIDING STRUCTURE WITH LASING PROPERTIES

[75] Inventors: Benjamin J. Ainslie; Susan P. Craig-Ryan, both of Suffolk, England

[73] Assignee: British Telecommunications public limited company, London, England

[21] Appl. No.: 165,165

[22] Filed: Dec. 10, 1993

Related U.S. Application Data

[63] Continuation of Ser. No. 960,470, Dec. 16, 1992, Pat. No. 5,278,850.

[30] Foreign Application Priority Data

May 16, 1990 [GB] United Kingdom ............... 9010943

[51] Int. Cl.⁶ .............................................. H01S 3/30
[52] U.S. Cl. ........................................ 372/6; 359/341; 385/142
[58] Field of Search ............... 385/142; 372/6; 359/341

[56] References Cited

U.S. PATENT DOCUMENTS

| | | | |
|---|---|---|---|
| 4,074,633 | 12/1991 | Cohen et al. | 385/43 |
| 5,087,108 | 2/1992 | Grasso et al. | 385/27 |
| 5,210,631 | 5/1993 | Huber et al. | 359/132 |
| 5,225,925 | 7/1993 | Grubb et al. | 359/341 |

FOREIGN PATENT DOCUMENTS

0313209 4/1989 European Pat. Off. ........ H01S 3/06

OTHER PUBLICATIONS

"Optical Fibres with an Al₂O₃—Doped Silicate Core Composition", Simpson et al., *Electronics Letters*, vol. 19, No. 7, 31 Mar. 1983, pp. 261–262.

"Neodynium-doped Silica Lasers in End-Pumped Fiber Geometry", Stone et al., *Appl. Phys. Lett.*, vol. 23, No. 7, 1 Oct. 1973, pp. 388–389.

"Fabrication and Characterization of Low-Loss Optical Fibers Containing Rare-Earth Ions", *Journal of Lightwave Technology*, Poole et al., vol. LT-4, No. 7, Jul. 1986, pp. 870–875.

"Aluminum or Phosphorus Co-Doping Effects on the Fluorescence and Structural Properties of Neodymium-Doped Silica Glass", Arai et al., *J. Appl. Phys.*, 59(10), 15 May 1986, pp. 3430–3436.

*Patent Abstracts of Japan*, vol. 11, No. 328, 27 Oct. 1987, & JP-A-62 111208 (Nippon Telegraph & Telephone Corp.) 22 May 1987.

*Optical Fiber Communication Conference*, 9 Feb. 1989, Houston, Tex., Brocko: "Rare-Earth-Doped Optical Fibers by the Outside Vapor Deposition Process", p. 20, Peter L. Bocko.

*IEEE Photonics Technology Letters*, vol. 2, No. 1, Jan. 1990, New York, pp. 18–20; Chen et al: "A Widely Tunable Erbium-Doped Fiber Laser Pumped at 532nm".

*IEEE Photonics Technology Letters*, vol. 2, No. 1, Jan. 1990, New York pp. 35–37; Becker et al: "Erbium-Doped Fiber Amplifier Pumped in the 950–1000 NM Region."

*14th European Conference on Optical Communication*, 15 Sep. 1988, Brighton, UK, pp. 433–436; Poole: "Fabricaton of Al2O3 Co-Doped Optical Fibres by a Solution-Doping Technique", S. B. Poole.

*Primary Examiner*—Frank Gonzalez
*Attorney, Agent, or Firm*—Nixon & Vanderhye

[57] ABSTRACT

Optical wave-guides, e.g. fibres, for use as photonic amplifiers have a path region partly or, preferably, wholly composed as a silica/germania glass with 0.1 to 5000 ppm mole of $Er^{3+}$ as a lasing additive and alumina to adjust the bandwidth, the Ge:Al mole ratio being more than 2.8, e.g. 1:0.001 to 0.25. It is surprising that low amounts of alumina have a useful and significant effect on the lasing bandwidth whereby frequency division multiplex is facilitated.

23 Claims, 1 Drawing Sheet

WAVE-GUIDING STRUCTURE WITH LASING PROPERTIES

CROSS-REFERENCE TO RELATED APPLICATION

This is a continuation of our application Ser. No. 07/960,470 filed Dec. 16, 1992 and now issued as U.S. Pat. No. 5,278,850. This application is related to U.S. Pat. No. 4,923,279 including Ainslie and Craig as inventors and a reissue application therefor Ser. No. 07/879,843 filed Apr. 6, 1992 (still pending).

BACKGROUND OF THE INVENTION

1. Field of the Invention

This invention relates to wave-guiding structures and, more specifically, it relates to wave-guiding structures in which the lasing species is erbium, eg the ion $Er^{3+}$. The lasing species is contained in a silica based glass.

2. Related Art

During the period 1985–1990 there has been substantial interest in the use of photonic amplifiers in telecommunications optical networks. This has included both semiconductor devices in which the primary source of power is electrical as well as wholly optical devices in which a signal at one optical wavelength is amplified and the power to drive the amplification is derived from a pump optical signal at a different frequency. The wholly optical devices can be configured in the form of a fibre wave-guide which is geometrically compatible with the transmission fibre in the telecommunications network. This geometrical compatibility confers substantial operating advantages and these advantages have given substantial technical significance to research into lasing structures and especially into lasing structures which can be implemented in the form of fibre.

Wavelengths in the range 1500 nm to 1600 nm have been recognised as particularly suitable for use in optical telecommunications and, therefore, photonic amplifiers which amplify at these wavelengths are of particular interest. It has been recognised that erbium, eg the ion $Er^{3+}$, will, when suitably pumped, lase at these wavelengths. Thus photonic amplifiers based on erbium as a lasing species have been extensively studied.

More recently it has been recognised that erbium contained in a host glass of silica and germania has an operational bandwidth which is undesirably narrow for some applications. For example, it may be desired to operate a frequency division multiplex which uses optical signals at both 1530 nm and 1560 nm. It has been found difficult to achieve satisfactory amplification at both of these wavelengths because of the narrow operational bandwidth of the erbium lasing species.

SUMMARY OF THE INVENTION

It has now been most surprisingly discovered that the operational bandwidth of the erbium can be increased to a satisfactory extent by the presence of only a small quantity of alumina in a host glass containing 3–30% mole of germanium in silica. The fact that the concentration of alumina is surprisingly low is of substantial operational importance because the alumina has very little effect on the other operational parameters of the wave-guide structure.

According to this invention the path region of a wave-guiding structure is wholly or partly formed of a laser composition which has 0.1 ppm molar to 5000 ppm molar or erbium contained in a host glass which consists essentially of $SiO_2$, $GeO_2$, $Al_2O_3$ and additives. In this composition the amount of the additive is less than 5% by weight, preferably less than 1% by weight. The path region contains x mole % of the $GeO_2$ and ax mole % of the $Al_2O_3$ wherein X=3–30 and a is less than 0.35 (eg a is in the range 0.001 to 0.35), preferably a=0.01–0.25, ie the mole ratio of Ge:Al is more than 2.8 and preferably Ge:Al=1:0.01–0.25.

There are two major variants of this invention. In the first variant the path region is of approximately uniform composition and it consists entirely of the lasing composition.

In the second variant of the invention the composition of the path region is designed to be non uniform. The concentration of the erbium is greater in the central path region than at the periphery thereof. Preferably the path region consists of two regions, namely an inner region and an outer region which surrounds the inner region. The inner region is preferably of approximately uniform composition and it consists entirely of the lasing composition as specified above. The outer region consists of a different glass which may have the same refractive index as the inner region. The inner region preferably constitutes not more than a quarter, eg 5% to 25%, of the cross-sectional area of the path region.

(The concept of non-uniformly distributed lasing additives in glass fibre wave-guides is disclosed in EP 313209 and to Japanese equivalent JP 89/145881. Copending applications were also filed on Oct. 13, 1988 as U.S. Ser. No. 257,101 and CA 508531.)

The most important of the additives is phosphorous, which may be present in the fibre in the form of a phosphate. The presence of phosphorous reduces the viscosity of the glass which makes it possible to work at lower temperatures. The presence of the phosphorous in the core helps to reduce the risk of crystallisation by the $Al_2O_3$ and this crystallisation is a substantial risk in certain preparative techniques. At low concentrations of $Al_2O_3$ it is possible to avoid the use of phosphorous in the core.

The preferred configuration is an optical fibre in which the path region as specified above constitutes the whole of the core which is surrounded by a cladding of a different glass composition which has a lower refractive index than the core. The preferred cladding glass composition is pure silica, optionally containing melting point depressants such as phosphorous and fluorine to control the refractive index.

As well as the fibre per se, the invention includes photonic amplifiers comprising a lasing length of fibre according to the invention coupled to a pump for providing pump radiation to excite the erbium into an inverted population state suitable for sustaining the lasing process.

Several different wavelengths are suitable for use as a pump radiation, these include 514 nm, 650 nm, 800 nm 980 nm, and 1480 nm (these figures should be regarded as having a tolerance of 125 nm). Of these five wavelengths 980 nm and 1480 nm are regarded as particularly suitable.

The lase length of the fibre is related to the available pump power and the concentration of the erbium. A higher pump power enables a longer last length to be used and lower erbium concentrations are also related to a longer laser length. Recent experience suggest that better amplification is achieved by using relatively low erbium concentrations and relatively long laser lengths, ie the gain per meter is small but a high total gain is achieved by using a long laser length. It is considered that adequate gain is unlikely to be achieved with laser lengths of less than 0.5 m whereas it would be difficult to propagate pump radiation over laser lengths of more than 10 km. For most purposes it is considered that laser lengths of 1 m–200 m, preferably 10 m–50 m, would be appropriate.

The invention also includes telecommunications systems which comprise an amplifier as defined above having the input and output fibres operatively coupled to input and output transmission fibre.

It will be appreciated that a telecommunications system, eg a submarine system, is complicated, important and expensive technology and, therefore, its components are individually designed for the system's specific requirements. The most important requirements which affect the amplifying fibre are:

(a) that the amplifying fibre shall match, as closely as possible, the transmission properties of the transmission fibre, and (b) the amplifying fibre must support lasing transitions to give a high gain for a low pump power. It is also important to minimise, the preferably eliminate, any tendency to oscillate which means that it is important to minimise reflection at the two ends of the laser lengths.

Requirement (a) indicates that the core of the amplifying fibre be of similar size as the core of the transmission fibre. It is easy to appreciate that mis-matched core sizes will cause signals to be lost at either the input or the output end. It is also convenient that the external diameters be the same which implies that the claddings are the same. Matching the cladding sizes is less important than matching the core size.

Requirement (a) also indicates that the optical properties be matched, ie that the refractive indices be the same. (It will be appreciated that a refractive index step in a path tends to cause unwanted reflections.) The difference between the refractive indices of core and cladding is an important performance parameter but individually matching the core and cladding indices also matches the difference. In the case of the cladding it is possible, and usually desirable, to utilise the same composition for both transmission and amplifying fibre. The composition is usually $SiO_2$ with P and F as additives.

Requirement (b) necessitates that a laser additive, ie erbium or $Er^{3+}$, is present in the core of the amplifying fibre and this prevents the same core compositions being used in transmission and amplifying fibre. The transmission fibre usually has a core of silica/germania glass and this can be used as the host glass in the amplifying fibre. The concentration of erbium is adjusted to give the desired laser power but the bandwidth is less than ideal. The bandwidth can be made wider by introducing alumina into the core. Adjusting the Ge:Al ratio within the ranges stated enables a desired bandwidth to be achieved. The alumina increases the refractive index so it will be necessary to adjust the germania content to obtain an exact index match between cores of transmission and amplifying fibre. In some instances it may be appropriate to introduce phosphorous to help stabilise the composition and this may also require adjustment of the germania to achieve an index match.

(If a fibre with two regions in the core is used, the outer region conveniently has the same composition as the core of the transmission fibre and the above considerations apply to the inner zone.)

One method of making optical fibre wave-guides according to the invention utilises the modified chemical vapour deposition process usually identified as MCVD. MCVD is sometimes known as inside deposition process because the glasses which eventually form the operative part of the fibre are produced by converting the equivalent chlorides into the desired oxides which are deposited, layer by layer, on the inner surface of a substrate tube. Usually a total of 10–30 layers are deposited. As initially deposited, the glass is porous but the porous material is immediately fused to give a solid layer upon which subsequent layers are deposited. When all the layers have been deposited the tube is collapsed into a rod which is drawn into fibre.

To make fibre according to this invention this procedure is followed for the cladding but a precursor of the core is deposited but left in the porous state. The erbium and the aluminium are introduced as solution into the porous layers. After solvent removal and conversion to oxides if necessary, the porous layer is consolidated and the tubular configuration is collapsed into a rod which is then drawn into fibre. It should be noted that the introduction of additives by soaking the porous layers is a well-known modification of the MCVD process.

Other methods of making the fibre include:
1) The vapour axial deposition (VAD) technique whereby a porous boule of doped silica is fused into a rare-earth doped boule by fusing at approximately 1200°–1400° C. in an atmosphere of the rare-earth chloride. Alternatively the boule can be soaked in an alcoholic solution as described in the MCVD technique above. The fused doped boule is surrounded by a cladding glass and drawn into fibre.
2) The outside vapour deposition (OVD) technique has also been reported to make rare-earth doped fibre. This is similar to the VAD process, but the rare-earth dopant is introduced into the boule during the deposition process from an organo-metallic source.

DETAILED DESCRIPTION OF THE DRAWINGS

The invention will now be described by way of example with reference to the accompanying drawings in which.

DETAILED DESCRIPTION OF EXEMPLARY EMBODIMENTS

Figure 1:
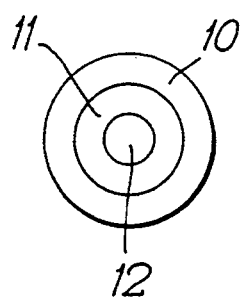
FIG. 1 illustrates a fibre according to the invention made by the MCVD process and having an uniform core.

The preferred embodiment of the invention, as shown in FIG. 1, is a fibre which has a residual layer 10 which is the residue of the substrate tube used in the MCVD process. Inside the residual layer 10 the fibre has a conventional cladding 11. The residual layer 10 consists of substantially pure silica glass and the cladding region 11 consists of silica glass, usually having a slightly higher purity than that of the residual layer 10, but containing phosphorous and fluorine as dopants to reduce the melting point of the silica in order to facilitate processing.

The phosphorous slightly increases the refractive index of the cladding but the fluorine slightly reduces the refractive index. The ratio of F/P is adjusted so that the refractive index of the cladding 11 is substantially equal to the refractive index of the residual layer 10. This ensures that the two layers 10 and 11 function as a single cladding in the optical wave-guide. In some instances excess F is introduced into the cladding glass to produce a low index material.

The core region 12 is of uniform composition and it is formed of a silica/germania glass which contains $Er^{3+}$ as the lasing additive and alumina to adjust the lasing bandwidth of the $Er^{3+}$. The composition of the core 12 will be further specified in examples given below.

Figure 2:
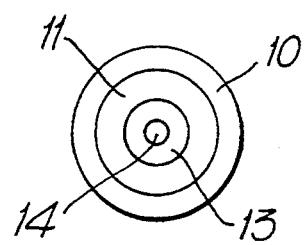
FIG. 2 illustrates an alternative form of fibre made by the MCVD process and having a core consisting of an inner and an outer zone.

An alternative form of fibre according to the invention, which is shown in FIG. 2, includes the same layers 10 and 11 as shown in FIG. 1. However, the core comprises an outer region 13 which surrounds an inner region 14. The outer region 13 consists of a silica/germanium glass and the inner region 14 also contains alumina and the lasing species $Er^{3+}$. It should be noted that there is no lasing species and no aluminium in the outer region 13.

Fibre as illustrated in FIG. 1 was prepared by a substantially conventional MCVD process in which a substrate tube was rotated in a glass blowing lathe while a reactant gas was passed through its bore. In the course of the preparation two different reactant mixtures, to be specified below, were used.

A short segment of tube, about 2 cm long, was heated to reaction temperature by a travelling flame. In this segment chlorides were converted into oxides which deposited as a porous ring downstream of the flame. As the flame traversed, in the case of cladding, the deposit was fused to form a thin layer on the inner surface of the substrate tube. In the case of the core, a lower temperature was used so that the deposit did not fuse whereby it remained porous.

The reaction mixture used to form the cladding precursor was obtained by bubbling:

700 ml/min of $O_2$ through $SiCl_4$,
90 ml/min of $O_2$ through $POCl_3$.

The mixture of these two gas streams was diluted with 1.5 liter/min $O_2$ and 1.0 liters/min He. In addition, 2.5 ml/min of $CCl_2F_2$ were included in the mixture. The maximum temperature in the hot zone was 1600° C. and the flame travelled at 18 cm/min. The ratio of F:P was chosen so that the RI of the cladding was equal to that of the substrate tube.

Ten cladding layers were thus deposited on a substrate tube of 10 mm inner diameter. These fused together to form a cladding layer of $SiO_2$ doped with $P_2O_5$ and fluoride.

Three layers to form the core were deposited next. The reaction mixture used for each layer was obtained by bubbling:

100 ml/min of $O_2$ through $SiCl_4$
120 ml/min of $O_2$ through $GeCl_4$
10 ml/min of $O_2$ through $POCl_3$.

The mixture of these three gas streams was diluted with 1.5 liters/min of $O_2$. The torch traverse rate was 17 cm/min and the maximum temperature was at 1300° C. (which is too low to fuse the deposit).

(Note. In all bubbling operations the liquid was at 25° C.) At this point the tube was removed from the lathe and dopants were introduced into the porous layers by immersion for 1 hour in an aqueous solution of 0.65M $AlCl_3.6H_2O$
0.002M $ErCl_3.6H_2O$
(Note, alcoholic solutions are also suitable.)

After soaking, the tube was drained, blown dry with $N_2$ for one hour, and returned to the lathe where it was heated at about 800°–1000° C. for a few minutes. This completed solvent evaporation. The temperature was raised to about 1900° C. for collapse to a rod. This also ensured conversion of $AlCl_3.6H_2O$ to $Al_2O_3$ and $ErCl_3$ to $Er_2O_3$. The tube was flushed with $O_2$/He mixture during all of these stages (about 10% volume of $Cl_2$ is advantageously introduced into the $O_2$/He mix to assist in obtaining a dry product.)

The resulting preform was drawn to a fibre as specified in Table I.

TABLE I

| Cladding (11) | |
|---|---|
| OD | 15.7 μm |
| ID | 5.4 μm |
| RI | matched to silica |
| Core (12) | |
| Diameter | 5.4 μm |
| Ge | 7.5 wt % |
| Al | 0.35 wt % |
| $Er^{3+}$ | 500 ppm |
| $SiO_2$ | balance |
| Mole ratio | Al:Ge = 0.1:1 |
| General Properties | |
| OD | 120 μm |
| $LP_{11}$ Cut Off | 1240 nm |
| RI step | .016 |

A fibre as illustrated in FIG. 2 was prepared by a method similar to that described above. A cladding consisting of 20 layers was prepared using the reactants designated above and this was follows by the deposition of 3 layers of $SiO_2/GeO_2$ each of which was fused as it was deposited. Finally, 3 layers of $SiO_2/GeO_2$ were deposited and left in the porous state. These layers were soaked with aluminium nitrate and erbium chloride as described above. After soaking, the tubular structure was converted to fibre using a method as described above.

Figure 3:
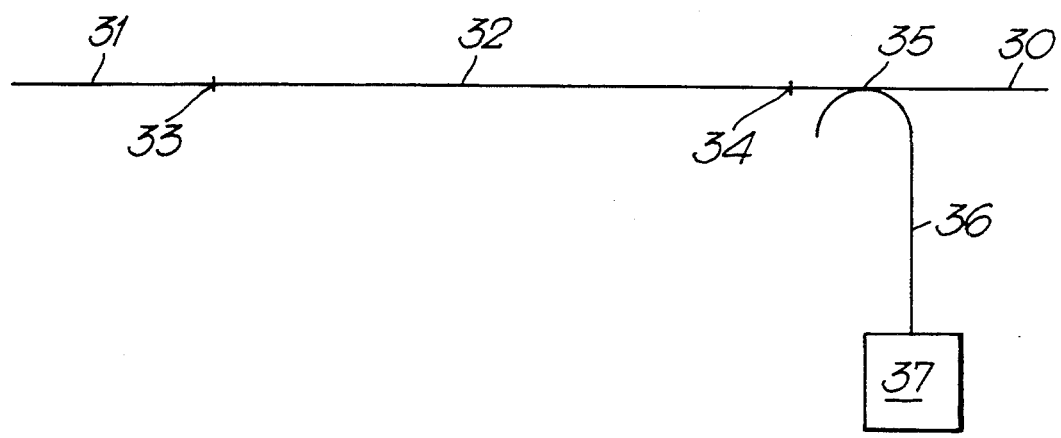
FIG. 3 illustrates an amplifier configuration.

FIG. 3 shows an amplifier using the fibre specified in Table 1 as the amplifying medium 32. The amplifier comprises an input transmission fibre 30 fusion-linked at 34 to 20 m of amplifying fibre 32 which is also linked, at 33, to output transmission fibre 31. Both transmission fibres 30 and 31 have silica glass claddings and germania/silica glass cores. A pump 37, which provides pump radiation at 1480 nm, is connected to link fibre 36 which forms a wavelength selective fused fibre coupler 35 with the input transmission fibre 30. The coupler 35 passes the pump radiation at 1480 nm into the amplifying fibre 32 but it does not take out signals at 1530 nm to 1560 nm.

Using pump power of 70 mW the amplifier gave a gain of 30 dB for signals at 1550 nm. More specifically, it amplified an input power of 0.01 mW to an output power of 10 mW. The "full-width half-maximum" bandwidth was measured for this amplifier. This measurement specifies the bandwidth, in nanometers, over which the gain is at least half the maximum gain available. For the amplifier shown in FIG. 3 the FWHM bandwidth was 35 nm (and the specific amplifications at two wavelengths of interest, namely 1530 nm and 1560 nm, was 27 dB or better).

The effect of the Ge:Al ratio can be illustrated by the fluorescent spectra of silica/german/alumina glasses since it is the performance of the glass which is exploited in the fibre. The FWHM bandwidth of fluorescence, ie the bandwidth over which the fluorescence is half the maximum, is similar to the figures quoted above and it can be used as a guide to fibre performance. Values for glasses with five different Ge:Al ratios are given in Table 2.

TABLE 2

| Mole Ratio Ge:Al | FWHM |
|---|---|
| 1 0 | 26.5 nm |
| 1 0.03 | 37 nm |
| 1 0.10 | 43 nm |
| 1 0.35 | 46 nm |
| 0 1 | 47 nm |

Table 2 indicates that the maximum bandwidth is achieved in glasses which contain silica and alumina with no germania. However, bandwidth is not the only consideration which affects the performance of amplifying fibre. Other properties, and particularly the excess attenuation and compatability must also be taken into account. In respect of these properties alumina is undesirable and the use of fibre with high alumina content is, in many applications, not acceptable.

The "excess" attenuation of a laser fibre is that part of the attenuation which is comparable to the attenuation of transmission fibre but the attenuation of both the pump wavelength and the signal wavelength must be taken into account. The erbium, ie the laser additive, is intended to interact with both pump and signal wavelengths. Pump radiation is clearly, and intentionally, attenuated by the lasing process but there may also be undesired additional attenuation, eg caused by mechanisms similar to the mechanisms which cause attenuation transmission fibre, which constitute the "excess" pump attenuation. The signal wavelength can also be absorbed by the erbium but, in normal laser operation, the erbium is excited by the pump radiation so the amplification occurs. However, these are still additional mechanisms similar to the attenuation in transmission fibre and these additional mechanisms constitute the "excess" attenuation signal.

Many telecommunications networks use silica/germania fibre and, therefore, there is a requirement for laser fibre based on silica/germania to achieve compatibility with the transmission fibre in the rest of the network. The presence of large proportions of alumina would cause excess attenuation. Table 2 indicates that a mole ratio Ge:Al equals 1:0.35 gives nearly the same bandwidth as a silica alumina fibre whereas this small proportion of alumina has relatively little effect upon the excess attenuation and other transmission properties of the fibre. Table 2 also indicates that very low, eg Ge:Al ratio below 1:0.01, can give very slight enhancement of the bandwidth which may be appropriate in certain circumstances where it is necessary to affect only minimally the transmission properties of the fibre. However, for most purposes it is considered that mole ratios above Ge:Al equals 1:0.01 would be acceptable.

When laser amplifiers in the form of fibre were first suggested it was considered that very short lengths of fibre, eg below 0.5 m, would be appropriate and, in these circumstances, the excess attenuation of the laser fibre is unimportant because of the short distance. It has now been realised that there are substantial advantages in performing the amplification over longer distances. Distance of 10 m–200 m are under present consideration and it is believed that in the future even longer distances, eg up to 2 km may be appropriate. At these long laser lengths the effect of excess attenuation becomes important and it is even possible that the excess attenuation could nullify the amplification. It is, therefore, important to provide laser fibre with very low excess attenuation.

We claim:

1. A method of amplifying optical signals at a wavelength close to 1550 nm, said method comprising:
  providing a lasing composition which forms at least part of the core of an optical fibre waveguide wherein said lasing composition is a silica-germania glass containing erbium as a lasing additive and alumina to adjust the bandwidth of operation of the erbium, said lasing composition containing 0.1–5000 ppm molar of erbium and the mole ratio of Ge:Al=1:X where X is less than 0.36; and
  simultaneously providing said optical signals and optical pump radiation into said lasing composition so that the pump radiation produces a population inversion in the erbium whereby said signals are amplified by lasing action.

2. A method as in claim 1 wherein X is within the range 0.001 to 0.35.

3. A method as in claim 2 where X is within the range 0.01 to 0.25.

4. A method as in claim 2 wherein X is within the range 0.03 to 0.35.

5. A method as in claim 1 wherein the amount of germania in the lasing composition is 3–30% mole.

6. A method as in claim 1 wherein the pump radiation is at either 980 nm or 1480 nm wavelength.

7. A method as in claim 1 wherein said amplification takes place over a path length of 1 m to 1000 m.

8. A method as in claim 7 wherein the path length is 10 m–200 m.

9. A method as in claim 1, wherein said lasing composition forms the whole of the core.

10. An optical telecommunication system which comprises:
  continuous fibre for the transmission of optical signals;
  said continuous fibre including transmission fibre optically coupled to amplification fibre in at least one optical fibre amplifier,
  at least part of the core of said amplification fibre being formed of a silica-germania glass containing erbium as a lasing additive and alumina to adjust the bandwidth of operation of the erbium wherein said lasing composition contains 0.1–5000 ppm molar of erbium and the mole ratio of Ge:Al=1:X where X is less than 0.36,
  said lasing composition being optically connected to pump means for providing pump radiation into said lasing composition so that the pump radiation produces a population inversion in the erbium whereby said transmitted signals are amplified by lasing action.

11. A system as in claim 10 where X is within the range 0.001 to 0.35.

12. A system as in claim 11 wherein X is within the range 0.01 to 0.25.

13. A system as in claim 11 where X is within the range 0.03 to 0.35.

14. A system as in claim 10 wherein the pump means is adapted to provide pump radiation at either 980 nm or 1480 nm wavelength.

15. A system as in claim 10 wherein each length of said amplification fibre is 1 m to 1000 m.

16. A system as in claim 15 wherein each length of amplification fibre is 10 m–200 m long.

17. A system as in claim 10 wherein said lasing composition forms the whole of the core of said amplification fibre.

18. A system as in claim 10 wherein the transmission fibre has a core of a silica/germania glass.

19. A system as in claim 18 wherein the transmission fibre and the amplification fibre both have claddings of a silica glass.

20. A system as in claim 19 wherein the glass of the cladding of the transmission fibre has substantially the same composition as the glass of the cladding of the amplifying fibre.

21. A system as in claim 10 in which the transmission fibre is fusion linked to the amplifying fibre and the pump is connected for the provision of pump radiation to the amplifying fibre by means of a wavelength selective fused fibre coupler.

22. A system as in claim 21 wherein each pump is connected to link fibre having the same structure as the transmission fibre and the wavelength selective fused fibre coupler is formed between the link fibre and the transmission fibre.

23. An optical telecommunication system which comprises:

a continuous fibre for the transmission of optical signals, said continuous fibre including transmission fibre and amplification fibre in at least one optical amplifier, said transmission fibre being fusion linked to said amplification fibre, said transmission fibre comprising a cladding and a core wherein said cladding is formed of a silica glass and said core is formed of a silica/germania glass, said amplification fibre comprising a cladding and a core wherein said cladding is formed of a silica glass and the whole of said core is formed of a lasing composition being a silica germania glass containing erbium as the lasing additive and alumina to adjust the bandwidth of operation of the erbium wherein said lasing composition contains 0.1–500 ppm mole of erbium and the mole ratio of Ge:Al=1:X where X is less than 0.36, said at least one optical fibre amplifier comprising, in addition to the amplification fibre, pump means connected to a link fibre connected to said transmission fibre by means of a wavelength selective fused fibre coupler, said link fibre having substantially the same composition as said transmission fibre, said connection being adapted to provide pump radiation into the core of said amplification fibre so as to produce a population inversion in the erbium whereby said optical signals are amplified.

* * * * *